United States Patent [19]

Fink

[11] Patent Number: 5,344,166
[45] Date of Patent: Sep. 6, 1994

[54] JAW ASSEMBLY FOR CHUCKS

[75] Inventor: Anton Fink, Searington, N.Y.

[73] Assignee: MicroCentric Corporation, New York, N.Y.

[21] Appl. No.: 130,101

[22] Filed: Sep. 30, 1993

[51] Int. Cl.⁵ .......................................... B23B 31/16
[52] U.S. Cl. .................................... 279/123; 279/153
[58] Field of Search ............. 279/123, 124, 152, 153; 269/259, 261, 262, 271, 280, 282-284

[56] References Cited

U.S. PATENT DOCUMENTS 463,373 11/1891 Skinner ............................... 279/123

*Primary Examiner*—Steven C. Bishop
*Attorney, Agent, or Firm*—Anthony J. Casella; Gerald E. Hespos

[57] ABSTRACT

A jaw assembly is provided for chucks. The assembly includes a master jaw mounted to a chuck for movement toward and away from the rotational axis. The master jaw includes a plurality of stepped apertures extending into the front face and parallel to the rotational axis. Each stepped aperture defines a mounting seat adjacent the front face and a threaded portion extending rearwardly from the mounting seat. Mounting buttons include stems that are press-fit into the mounting seats of the master jaws. Frustums project from the stems and away from the front face of the master jaw. The mounting buttons include apertures extending entirely therethrough and registered with the threaded portion of the stepped aperture in the master jaw. A top jaw is mounted to the front face of the master jaw. The top jaw has a plurality of apertures extending therethrough and registered with the apertures through the mounting buttons. Portions of each stepped aperture adjacent the rear face of the top jaw define frustum-shaped recesses which engage over the frustums of the respective mounting buttons.

10 Claims, 2 Drawing Sheets

JAW ASSEMBLY FOR CHUCKS

BACKGROUND OF THE INVENTION

A prior art chuck includes a chuck body that can be mounted to a machine for rotating the chuck about an axis. The chuck includes a plurality of master jaws that are mounted in the chuck body for movement in radial directions relative to the rotational axis, Top jaws are mounted to the front faces of the respective master jaws for holding a tool or workpiece during rotation. The top jaws are selected in accordance with size, shape and other characteristics of the tool or workpiece to be gripped, The front face of the prior art master jaw and the rear face of the prior art top jaw are appropriately configured to enable their interengagement, For example, some prior art top jaws include a plurality of bolt holes which are registrable with a corresponding plurality of threaded bolt holes in the prior art master jaw. Bolts are passed through the top jaw and are threadedly engaged in the corresponding bolt hole of the master jaw to hold the prior art top jaw on the associated prior art master jaw.

Some prior art jaw assemblies also include interengageable members to facilitate the initial alignment of the bolt holes of the top jaw with the threaded bolt holes of the master jaw. For example, some prior art master jaws include forwardly projecting cylindrical dowel pins that are parallel to but spaced from the bolt holes. The rear face of the corresponding prior art top jaw includes cylindrical recesses for receiving the dowel pins. The bolt holes of these prior art jaws are intended to be aligned when the cylindrical dowel pins and the cylindrical recesses are engaged. Other prior art master jaws include a rectangular tongue which is engageable in a correspondingly configured groove on a top jaw for aligning the bolt holes.

Just-in-time (JIT) manufacturing is preferred by many companies to keep their inventory low. Runs of machined parts tend to be smaller with the JIT manufacturing. Thus, a chuck operator could run as few as ten workpieces before switching over to another workpiece. Each run of workpieces is likely to require a new set of top jaws.

The prior art chuck assembly usually does not repeat precisely and accurately once the top jaws are changed. These problems with repeatability are at least partly due to the difficulty of achieving and maintaining precision between the engaged cylindrical or rectangular prior art master jaw/top jaw mounting structures. Even a high degree of precision requires some play to enable the cylindrical or rectangular structures to slidingly mate. As a result, the chuck operator must grind the jaws or go through other alignment procedures to re-attain the specified precision. The time that is lost to periodically regrind the prior art jaws is reflected in the cost of the finished product.

Cycle time also is increased by the constant changing and remachining of the top jaws. Cycle time is the time required to produce a product in the factory from the receipt of the order to shipment. Reducing cycle time is a major competitive strategy. It makes it possible to provide fast response to narrow market windows; reduce work in process (WIP) inventory; produce more in the same factory floor space; improve market forecasts; and provide shorter delivery intervals with improved assurance.

Cycle time could be reduced and the potential efficiencies of JIT manufacturing processes could be achieved by providing master jaws and top jaws that can be changed with no need for remachining or realignment.

In view of the above, it is an object of the subject invention to provide an improved top jaw-master jaw assembly for a chuck.

It is another object of the subject invention to provide a top jaw-master jaw assembly which maintains specified precision after changing top jaws.

Another object of the subject invention is to provide a top jaw-master jaw assembly which reduces set-up time (downtime) and decreases cycle time.

SUMMARY OF THE INVENTION

The subject invention relates to jaw assemblies for chucks. The subject jaw assembly comprises a master jaw and at least one top jaw removably mounted thereto. The jaw assembly enables the top jaws to be changed easily and used precisely without regrinding.

The master jaws of the jaw assembly are part of a chuck having a chuck body that has opposed front and rear ends. The rear end of the chuck body is mountable to a rotatably drivable machine. The front end of the chuck body has radially aligned grooves for movement toward or away from a rotational axis.

A master jaw of the jaw assembly has a front face for receiving one of the subject top jaws. Frustum-shaped mounting buttons protrude from the front face of each master jaw and taper to define smaller diameters at further protruded distances from the front end of the chuck body. The taper of each mounting button can be measured by the angle of generation of the frustum, which is defined by the intersection of projections from the central axis of the frustum and the conically generated sides. The taper is narrow enough to temporarily hold the top jaw on the master jaw prior to bolted engagement, as explained further herein. A preferred angle of generation for each frustum-shaped button is in the range of 7°–15°, and most preferably about 8°.

Each mounting button includes a cylindrical aperture extending axially therethrough and into the associated master jaw. Portions of the aperture disposed rearwardly in the master jaw are threaded to enable engagement with a bolt, as explained further herein.

The master jaw and the mounting buttons may be nonunitary. More particularly, the front face of each master jaw may include a plurality of stepped apertures aligned parallel to the rotational axis of the chuck. Portions of each aperture adjacent the front face of the master jaw may define a mounting seat. Rearwardly disposed portions of each aperture may be threaded, and may define a smaller cross-section than the mounting seat.

Each mounting button may include a rearwardly projecting mounting stem press fitted in the mounting seat of one of the stepped apertures in a master jaw. The mounting stem may define a smaller cross-section than the base of the frustum from which the mounting stem projects. Thus, a rearwardly facing step may be defined at the interface of the frustum and the mounting stem of each button. The step is orthogonally aligned to the central axis of the button, and hence seats securely against the front face of the master jaw. The above referenced cylindrical apertures extending through the frustum-shaped mounting buttons continue axially through the mounting stem for registration with the threaded portion of the associated stepped aperture in the master jaw.

Each top jaw of the subject assembly includes a front face and an opposed rear face for mounting to the front face of an associated master jaw. The top jaws have stepped apertures extending axially therethrough from the front face to the rear face. Portions of each aperture adjacent the rear face of the associated top jaw define frustum-shaped recesses which are disposed and dimensioned to receive the frustum-shaped buttons projecting from the associated master jaw. The frustum-shaped recesses in the respective top jaws have angles of generation substantially equal to the angles of generation of the frustum-shaped buttons. However, each frustum-shaped recess extends axially forwardly into the rear face of the associated top jaw a distance greater than the axial projection of the buttons from the front face of the master jaws. Thus, the buttons will not bottom-out in an associated recess, and the rear face of the top jaw will seat firmly against the front face of the associated master jaw. Portions of the apertures forward of the frustum-shaped recesses are generally cylindrical and are disposed to register with the apertures through the associated frustum-shaped buttons. The extreme forward end of each aperture may define a major diameter to enable the head of a bolt to be received therein.

The top jaw of the subject assembly is mounted to the master jaw such that the frustum-shaped buttons mate with the frustum-shaped recesses. As noted above, the angles of generation of the mating frustums enable temporary retention of the top jaw on the master jaw.

The jaw assembly may further include elongated bolts that are inserted through the apertures of the top jaw and through the buttons of the master jaw. The threads in the master jaw enable threadable engagement of the bolts to firmly secure the top jaw to the master jaw.

The frustum shape of the subject engagement means of the top jaw-master jaw assembly enables accurate face-to-face engagement without the play that had been required by the cylindrical or rectangular prior art engagement structures. Hence it is unnecessary to remachine the top jaws or to execute other realignment procedures after changing top jaws to accommodate a different-size workpiece. This absence of play is attributable to the frustum shaped buttons with the frustum-shaped recesses and the seating of the rear face of the top jaw tightly against the front face of the master jaw.

Moreover, the subject top jaw-master jaw assembly decreases machine idle time and cycle time. These efficiencies are at least partly due to the elimination or reduction of regrinding when top jaws are changed and the convenient holding of the top jaws on the frustum-shaped mounting buttons when the bolts are disengaged. This increases productivity and helps keep manufacturing costs down. The subject invention also allows for JIT manufacturing to be implemented and also provides a reliable starting point for quality control procedures to be realized and thereby, decrease rework and scrap.

DETAILED DESCRIPTION OF THE PREFERRED EMBODIMENT

Figure 1:
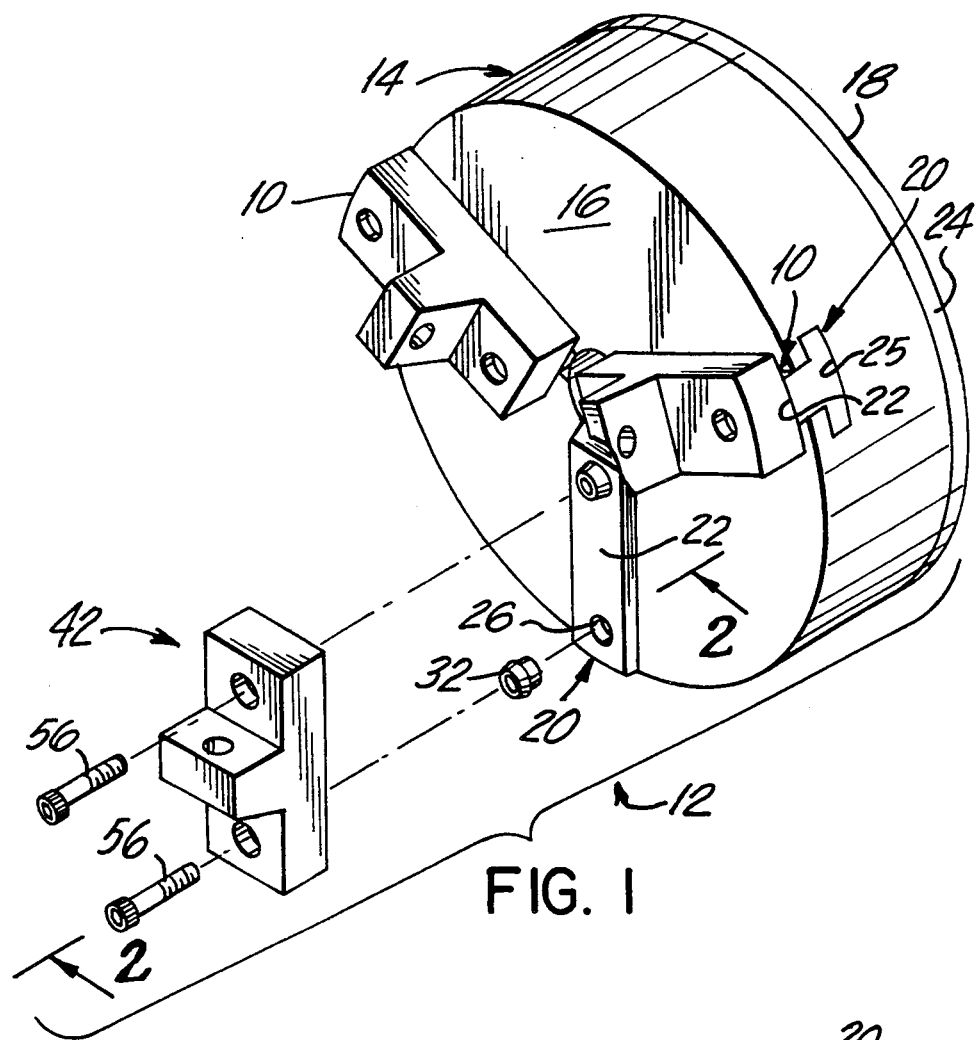
FIG. 1 is an exploded perspective view of a chuck with the top jaw-master jaw assembly of the subject invention.
Figure 2:
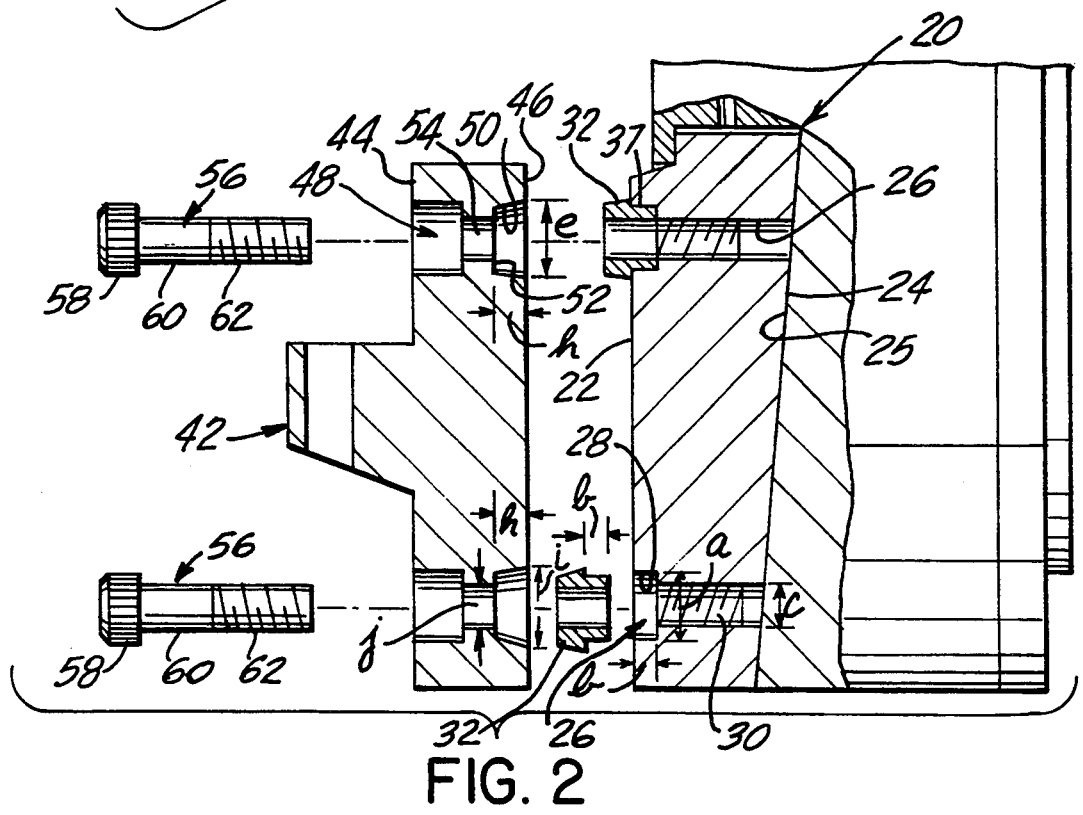
FIG. 2 is an exploded cross-sectional view taken along line 2—2 in FIG. 1.
Figure 3:
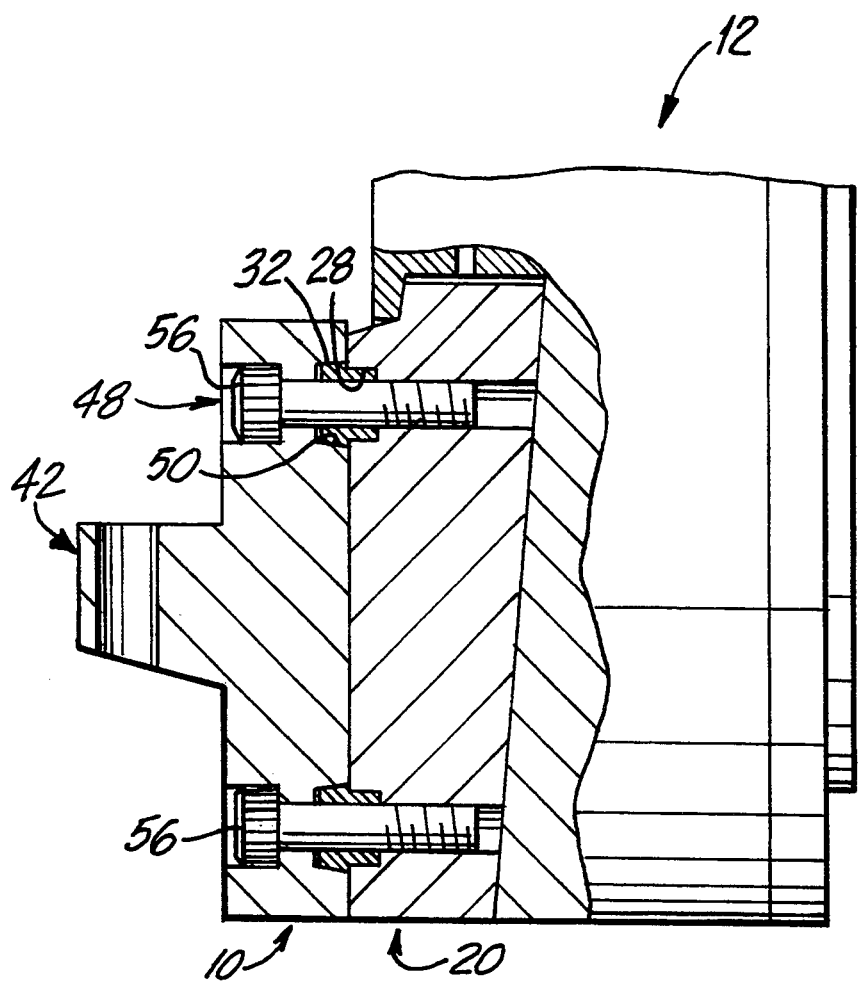
FIG. 3 is a cross-sectional view similar to FIG. 2, but showing the top jaw and master jaw in their fully assembled condition on the chuck.

Jaw assemblies of the subject invention are identified generally by the numeral 10 in FIGS. 1-3. The assemblies 10 are parts of a chuck 12 having a chuck body 14 with opposed front and rear faces 16 and 18 respectively. The jaw assemblies 10 are disposed to project from the front face 16 of the chuck body 14. Additionally, the assemblies 10 are operative to move in radial directions relative to the chuck body 14 for selectively gripping a workpiece therebetween.

Each jaw assembly 10 includes a master jaw 20 having a front face 22 projecting slightly forward of the front face 16 of the chuck body 14, and a rear 24 slidably engaged in the chuck body 14. More particularly, the rear 24 of each master jaw 20 defines a wedge of generally T-shaped cross-section which is angularly aligned to the central axis of the chuck 12. The angularly aligned wedge is engaged in an angularly aligned T-shaped slot 25 of the chuck body 14. The T-shape prevents each master jaw 20 from falling forwardly out of the chuck body 14. An actuator (not shown) moves forwardly or rearwardly in response to air or fluid pressure within the chuck body 14. Movement of the actuator within the chuck body causes the master jaws 20 to move radially inwardly or radially outwardly in the slot 25 of the chuck body 14.

The front face 22 of each master jaw 20 includes a pair of stepped apertures 26 extending therein parallel to the rotational axis of the chuck 12. Each stepped aperture 26 includes a forward cylindrical mounting seat 28 defining a major diameter "a" extending rearwardly into the master jaw 20 for an axially distance "b". Each stepped aperture 26 further includes a threaded portion 30 extending rearwardly from the mounting seat 28. The threaded portion 30 is concentrically aligned relative to the mounting seat 28 of the stepped aperture 26, but defines a smaller diameter "c".

Figure 4:
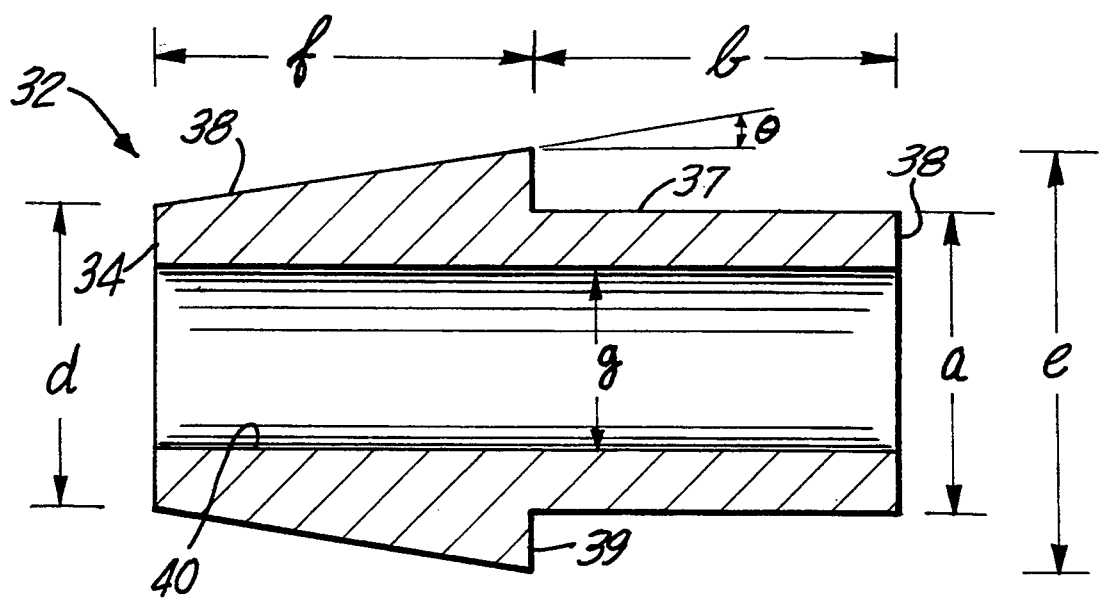
FIG. 4 is a cross-sectional view of a mounting button.

The jaw assembly 10 further includes mounting buttons 32 for each stepped aperture 26. As shown in FIG. 4, each mounting button 32 includes opposed front and rear ends 34 and 36 respectively. Portions of the button 32 extending forwardly from the rear end 36 define a cylindrical mounting stem 37 with a diameter "a" and a length "b" substantially equal to the corresponding dimensions of the cylindrical mounting seat 28 of the stepped aperture 26 in the master jaw 20. Thus, the cylindrical mounting stem 37 adjacent the rear end 36 of the button 32 can be press fitted into the cylindrical mounting seat 28 of one stepped aperture 26 in the associated master jaw 20.

Portions of each button 32 extending rearwardly from the front end 34 define a frustum 38 with a minor diameter "d" adjacent the front end 34 of the mounting button 32, and a major diameter "e" adjacent and forward of the stem 37 of the button 32. The frustum 38 defines an angle of generation $\Theta$ of between 7°-15° as shown in FIG. 2, and most preferably approximately 8° as shown in FIG. 4. The cylinder 37 and the frustum 38 meet at a rearwardly facing annular surface 39 which is orthogonally aligned to the axis of the button 32, and spaced from the front end 34 by distance "f". The minor diameter "d" of the frustum 38 may be approximately equal to the diameter "a" of the cylinder 37 of the button 32. The major diameter "e" at the rear end of the frustum 38 is substantially greater than the diameter "a" of the cylindrical mounting stem 37 of the button 32 and greater than the substantially identical diameter "a" of the cylindrical mounting seat 28 of the stepped aperture 26 in each master jaw 20.

Each mounting button 32 further includes a cylindrical aperture 40 extending axially therethrough from the front end 34 to the rear end 36. The aperture 40 defines a diameter "g" which is significantly less than the diameter "a" of the cylindrical portion of the button 32 and approximately equal to the diameter "c" defined by the threaded portion 30 of the stepped aperture 26 in the master jaw 20. Thus, the aperture 40 through the mounting button 32 will substantially align with the threaded portion 30 of the stepped aperture 26 when the cylindrical mounting stem 37 of the button 32 is press fitted into the cylindrical mounting seat 28 of the stepped aperture 26.

Returning to FIGS. 1-3, the jaw assembly 10 further includes a top jaw 42 having a front face 44 and a rear face 46 for mounting in abutting relationship to the front face 22 of one of the master jaws 20. The top jaw 42 is characterized by a plurality of apertures 48 extending axially therethrough and disposed to register with the stepped apertures 26 in the associated master jaw 20 when the top jaws 42 and master jaws 20 are assembled as explained further herein. Portions of each aperture 48 adjacent the rear face 46 of the top jaw 42 define a frustum-shaped recess 50 with a major diameter "e" adjacent the rear face 46 and substantially equal to the major diameter "e" of the frustum 38 of each respective mounting button 32. Additionally, each frustum-shaped recess 50 defines an angle of generation which is equal to the angle of generation Θ defined by the frustum 38 of the button 32. However, the frustum-shaped recess 50 extends a depth "h" into the rear face 46 of the top jaw 42 which is greater than the length "f" of the frustum 38 of the button 32. These dimensions prevent the frustum 38 of the button 32 from bottoming out in the frustum-shaped recess 50 of the top jaw 42 (see FIG. 3), and hence ensure that the rear face 46 of the top jaw 42 will mate tightly against the front face 22 on the master jaw 20. More particularly, the opposed frustum-shaped surfaces of the buttons 32 and recesses 50 engage in face-to-face relationship without the play required for cylindrical or rectangular mating structures of the prior art. Thus precise and repeatable connection and reconnection of the top jaw 42 can be achieved without the regrinding required with prior art structures.

The frustum-shaped recess 50 on each aperture 48 through the top jaw 42 terminates intermediate the opposed front and rear faces 44 and 46 at a step 52 extending orthogonal to the longitudinal axis of the chuck. The step 52 defines a minor diameter "i".

Portions of each aperture 48 through the top jaw 42 forwardly of the frustum-shaped recess define a cylinder 54 with a diameter "j" which is equal to the diameter "g" of the aperture 40 through the button 32. However, portions of each aperture 48 through the top jaw 42 in proximity to the front face 44 thereof define a major diameter for receiving a bolt head as explained further herein.

Two elongated bolts 56 are used to fasten the jaw assembly 10 to the chuck body 14. Each bolt 56 has a bolt head 58 and a cylindrical portion 60 extending therefrom. The cylindrical portion 60 contains a threads 62 extending a short distance from the end opposite the bolt head 58. The elongated bolts 56 are inserted through the apertures 48 of the top jaw 42 and through the apertures 40 of the mounting buttons 32. The threaded portions 62 emerge through the mounting stems 37 of the buttons 32 inside the master jaw 20, and are threadedly engaged with the thread 30 of the stepped apertures 26. The threadable engagement of the bolts 56 to the master jaw 20 firmly secure the top jaw 42 to the master jaw 20.

The 8° angle of generation for the frustum 38 and for the frustum-shaped recesses 50, enables the top jaw 42 to remain mounted on the mounting buttons 32 without the elongated bolts 56 when the top jaw is being changed. The top jaw 42 disengages from the buttons 32 only after it is gently tapped.

While the invention has been described with respect to a preferred embodiment, it is obvious that various changes and modifications can be made without departing from the scope of the invention which should be limited only by the appended claims.

What is claimed is:

1. A jaw assembly for a chuck having a rotational axis, said jaw assembly comprising:

a master jaw mounted to the chuck for movement toward and away from the rotational axis, said master jaw having a front face projecting from the chuck and a plurality of stepped apertures extending into the front face parallel to the rotational axis, each said stepped aperture defining a mounting seat adjacent said front face and a small diameter threaded portion extending rearwardly from the mounting seat;

a mounting button for each said stepped aperture, each said mounting button including a stem secured in said mounting seat and a frustum extending from said stem and projecting from the front face of the master jaw, the frustum defining a major diameter adjacent said stem, said major diameter being greater than cross-sectional dimensions of said stem, such that said mounting button includes a generally annular surface intermediate said stem and said frustum, said generally annular surface being seated against portions of the front face of the master jaw surrounding the respective stepped aperture, an aperture extending through each said mounting button and registered with the threaded portion of the respective stepped aperture;

a top jaw having a rear face abutting the front face of the master jaw and an opposed front face, a plurality of apertures extending through the top jaw and registered with the respective apertures through the mounting buttons, portions of each said aperture in said top jaw adjacent the rear face thereof defining a frustum-shaped recess engaged over the frustums of the respective mounting buttons; and mounting bolts passing respectively through the apertures in the top jaw and the mounting buttons and threadedly engaged with the threaded portions of the respective stepped apertures.

2. A jaw assembly as in claim 1, wherein the frustum of each said mounting button defines an angle of generation of between 7°-15°.

3. A jaw assembly as in claim 2, wherein the angle of generation equals approximately 8°.

4. A jaw assembly as in claim 1, wherein each said frustum projects a selected distance from the front face of the master jaw, and wherein each said frustum-shaped recess in the top jaw defines a depth greater than the projection of the frustum from the front face of the master jaw.

5. A jaw assembly as in claim 1, wherein the stem and the mounting seat are of complimentary cylindrical configurations.

6. A jaw assembly as in claim 5, wherein the stems and the mounting seats are in press-fitted engagement.

7. A jaw assembly for a chuck having a rotational axis, said jaw assembly comprising:

a master jaw mounted to the chuck for movement toward and away from the rotational axis, said master jaw having a front face projecting from the chuck and a plurality of frustum-shaped mounting buttons projecting from the front face of the master jaw, an aperture extending through each said frustum-shaped mounting button, portions of each said aperture rearwardly of the front of the master jaw being threaded, the master jaw and the frustum-shaped mounting buttons being of non-unitary construction and being securely interfitted with one another, the master jaw including mounting seats extending into said front face and extending to the threaded portions of the respective apertures in the master jaw, each said frustum-shaped mounting button having an annular rear face seated against portions of the front face of the master jaw surrounding the respective mounting seat, a mounting stem projecting unitarily from the rear face of each said frustum-shaped mounting button and securely received in the respective mounting seat, the apertures extending through the frustum-shaped mounting buttons continuing through the mounting stem and being registered with the threaded portion of the respective aperture in the master jaw;

a top jaw having a rear face abutting the front face of the master jaw and an opposed front face, a plurality of apertures extending through the top jaw and registered with the respective apertures in the mounting buttons, portions of each said aperture adjacent the rear face defining frustum-shaped recesses engaged over the frustum-shaped mounting buttons; and bolts extending through the respective apertures of the top jaw and the mounting buttons and threadedly engaged in the master jaw for securely holding the top jaw to the master jaw.

8. A jaw assembly as in claim 7, wherein the frustum-shaped mounting buttons and the frustum-shaped mounting recesses define complimentary shapes for at least temporarily retaining the top jaw to the master jaw upon separation of said bolts therefrom.

9. A jaw assembly as in claim 8, wherein said frustum-shaped mounting buttons and said frustum-shaped recesses define angles of generation of between 7°–15°.

10. A jaw assembly as in claim 9, wherein the angles of generation equal approximately 8°.

* * * * *